(12) United States Patent
Baptichon (10) Patent No.: US 10,384,705 B1
(45) Date of Patent: Aug. 20, 2019

(54) COLLAPSIBLE STROLLER (71) Applicant: Jayson Baptichon, Newark, NJ (US)

(72) Inventor: Jayson Baptichon, Newark, NJ (US)

( * ) Notice: Subject to any disclaimer, the term of this patent is extended or adjusted under 35 U.S.C. 154(b) by 0 days.

(21) Appl. No.: 16/174,352

(22) Filed: Oct. 30, 2018

(51) Int. Cl.
| B62B 9/00 | (2006.01) |
| B62B 7/06 | (2006.01) |
| B62B 9/14 | (2006.01) |
| B62B 9/26 | (2006.01) |
| B62B 9/12 | (2006.01) |
| B62B 9/20 | (2006.01) |
| B62B 9/10 | (2006.01) |

(52) U.S. Cl.
CPC .............. *B62B 7/064* (2013.01); *B62B 9/00* (2013.01); *B62B 9/108* (2013.01); *B62B 9/12* (2013.01); *B62B 9/14* (2013.01); *B62B 9/20* (2013.01); *B62B 9/26* (2013.01)

(58) Field of Classification Search
CPC ......... B62B 7/123; B62B 7/14; B60N 2/2848; A47D 1/00; A47D 13/025
See application file for complete search history.

(56) References Cited

U.S. PATENT DOCUMENTS

| 4,582,355 A | 4/1986 | Hall |
| 5,188,380 A | 2/1993 | Tucek |
| 6,068,322 A * | 5/2000 | Kuester ................... B62B 9/142 296/97.21 |
| 6,217,099 B1 * | 4/2001 | McKinney .............. B62B 9/142 160/89 |
| 6,224,073 B1 * | 5/2001 | Au .......................... B62B 9/142 280/47.38 |
| 7,360,772 B2 | 4/2008 | Koch |
| 8,011,693 B2 | 9/2011 | Nooshin |
| 9,333,981 B2 | 5/2016 | Roth |
| 9,463,821 B1 * | 10/2016 | Critchley ................. B62B 9/10 |
| 9,956,979 B1 * | 5/2018 | Fernsten .................. B62B 9/26 |
| 2007/0080519 A1 | 4/2007 | Murdock |
| 2010/0044164 A1 * | 2/2010 | Thorne .................... B62B 7/002 188/1.12 |
| 2016/0009219 A1 * | 1/2016 | Gilbert ................... B62B 9/005 280/47.38 |

* cited by examiner

*Primary Examiner* — James A Shriver, II
*Assistant Examiner* — James J Triggs
(74) *Attorney, Agent, or Firm* — Kyle A. Fletcher, Esq.

(57) ABSTRACT

The collapsible stroller is a manually propelled vehicle for transporting a child. The child is secured in a seat located within a pod mounted to a four-wheeled frame. The pod may have a transparent front to prevent protect the child from inclement weather. Vents located on the pod may allow air to circulate within the pod. One or more generators coupled to wheels may provide electricity to charge a battery located within the pod. The battery may be used to charge a device such as a smartphone, to operate lighting within the pod, or to operate ventilation fans. A modular insert may be placed over the child and filters may be attached to the modular insert to provide enhanced air filtration. The pod and frame may be disassembled and placed in a travel/storage bag when the stroller is not in use.

17 Claims, 6 Drawing Sheets

COLLAPSIBLE STROLLER

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child transportation, more specifically, a collapsible stroller.

SUMMARY OF INVENTION

The collapsible stroller is a manually propelled vehicle for transporting a child. The child is secured in a seat located within a pod mounted to a four-wheeled frame. The pod may have a transparent front to prevent protect the child from inclement weather. Vents located on the pod may allow air to circulate within the pod. One or more generators coupled to wheels may provide electricity to charge a battery located within the pod. The battery may be used to charge a device such as a smartphone, to operate lighting within the pod, or to operate ventilation fans. A modular insert may be placed over the child and filters may be attached to the modular insert to provide enhanced air filtration. The pod and frame may be disassembled and placed in a travel/storage bag when the stroller is not in use.

An object of the invention is to provide a collapsible stroller having a pod that protects a child from inclement weather.

Another object of the invention is to provide a modular insert and filters for enhanced air filtration within the pod.

A further object of the invention is to provide a generator attached to a wheel of the stroller to charge an internal battery.

Yet another object of the invention is to operate lighting, a ventilation fan, and a charging port from the internal battery.

These together with additional objects, features and advantages of the collapsible stroller will be readily apparent to those of ordinary skill in the art upon reading the following detailed description of the presently preferred, but nonetheless illustrative, embodiments when taken in conjunction with the accompanying drawings.

In this respect, before explaining the current embodiments of the collapsible stroller in detail, it is to be understood that the collapsible stroller is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the collapsible stroller.

It is therefore important that the claims be regarded as including such equivalent construction insofar as they do not depart from the spirit and scope of the collapsible stroller. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 8.

The collapsible stroller 100 (hereinafter invention) comprises a pod 200, electronics, and a frame 300. The invention 100 may be adapted to be a conveyance for a child 900. The invention 100 may be adapted to enclose the child 900 in the pod 200 for weather protection. The invention 100 may be adapted to cover the child 900 with a modular insert 270 for additional protection and/or filtration. The invention 100 may be adapted to charge a phone.

The pod 200 comprises a pod front shell 210, a pod rear shell 220, a seat 225, an accessory holder 240, and a tray/cup holder 245. The pod 200 may be an ovoid, ellipsoidal, or spherical covering for the seat 225 that is adapted to protect the child 900 from wind, rain, or other inclement weather conditions. The pod 200 may be made of impact resistant plastic. The pod 200 may couple to the frame 300.

Figure 1:
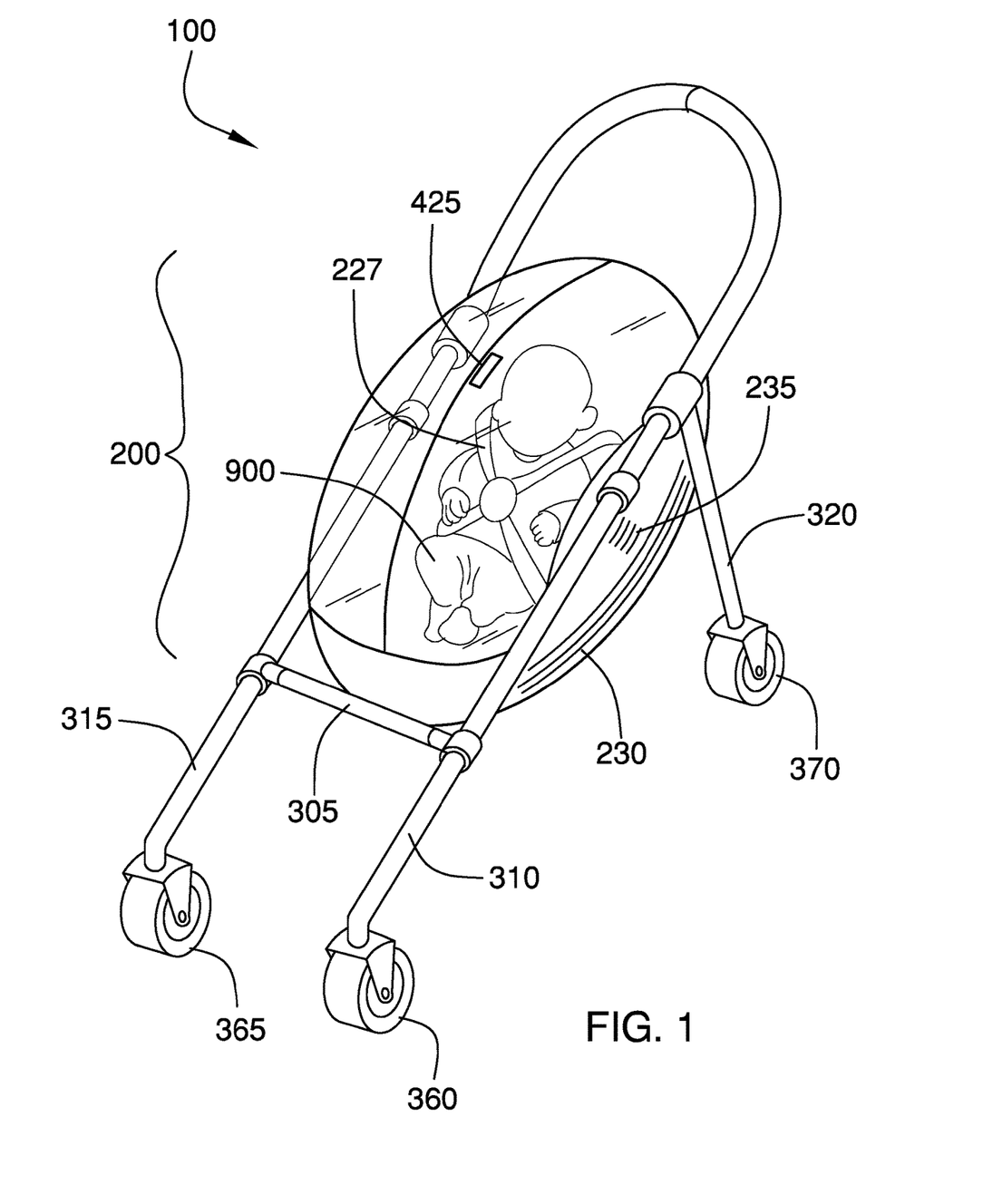
FIG. 1 is a perspective view of an embodiment of the disclosure.
Figure 2:
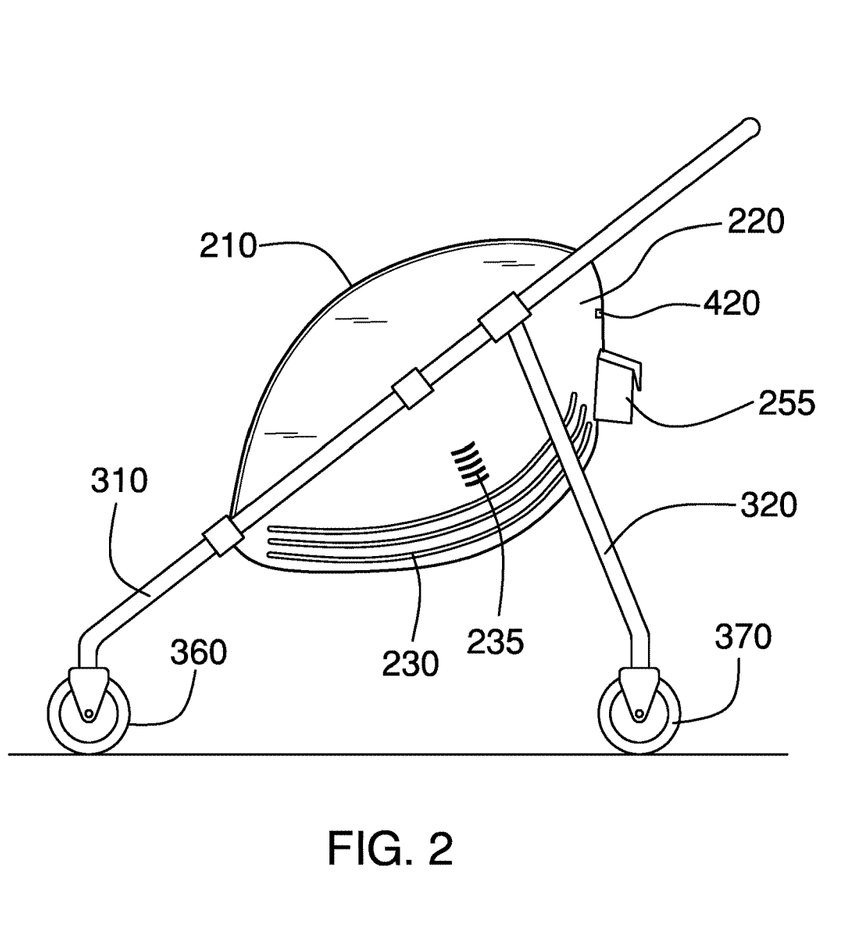
FIG. 2 is a side view of an embodiment of the disclosure.
Figure 3:
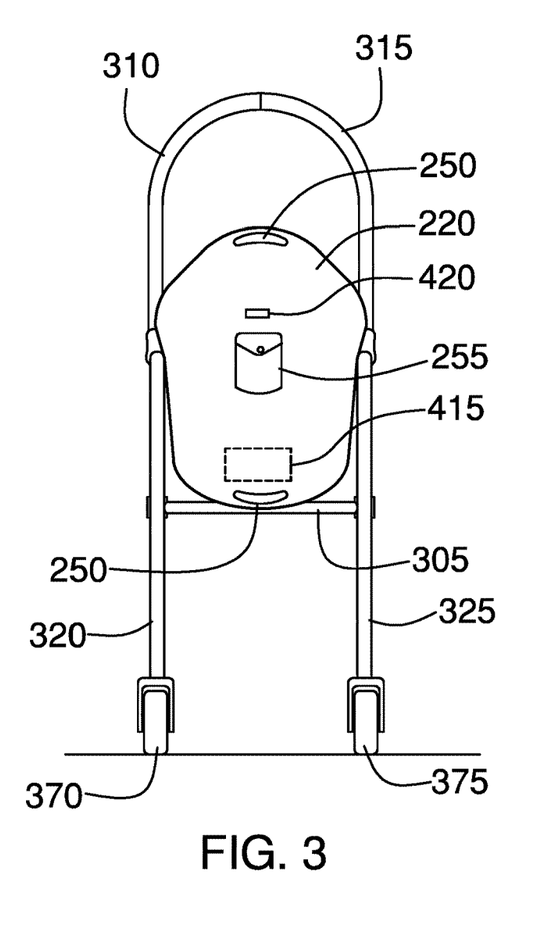
FIG. 3 is a rear view of an embodiment of the disclosure.
Figure 4:
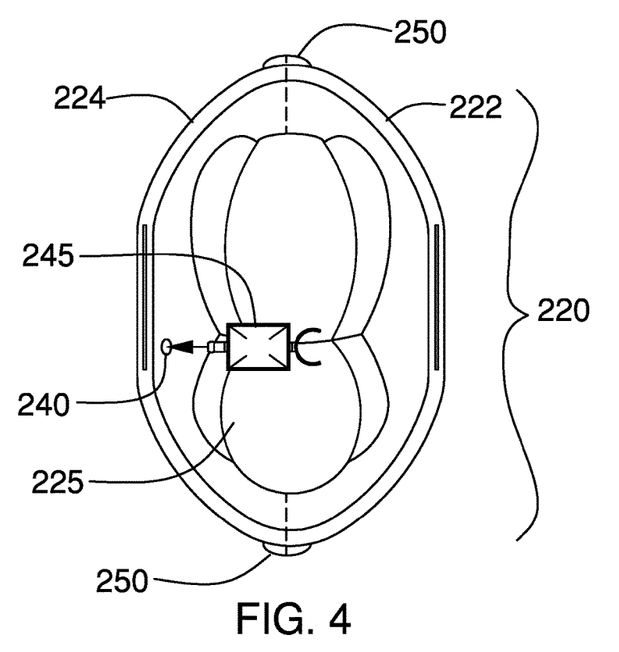
FIG. 4 is a detail view of an embodiment of the disclosure illustrating the interior of the pod rear shell.

The pod front shell 210 may be made from a transparent material and may be located in front of the seat 225. The pod rear shell 220 may be a rear half of the pod 200 and may be a mounting point for the seat 225. The pod rear shell 220 may comprise a plurality of vents 235 to allow airflow through the pod 200. A ventilation fan located behind one of the plurality of vents 235 may assist in moving air. The pod rear shell 220 may comprise a plurality of hand grips 250 to allow the pod 200 to be moved. As a non-limiting example, one of the plurality of hand grips 250 may be mounted at the top rear of the pod rear shell 220 and another of the plurality of hand grips 250 may be located at the bottom rear of the pod rear shell 220. The pod rear shell 220 may be made from an opaque material. The seat 225 may be a cushioned area adapted for the child 900 to sit in. The seat 225 may comprise a harness 227 that is adapted to retain the child 900. The bottom and/or back of the seat 225 may couple to the interior side of the pod rear shell 220.

The accessory holder 240 may be a mounting point for an accessory. The accessory holder 240 may be located on the left interior side wall of the pod 200, on the right interior side wall of the pod 200, or on both interior side walls of the pod 200. The tray/cup holder 245 may be the accessory for the invention 100. The tray/cup holder 245 may couple to the accessory holder 240 and may add a snack tray and a cup holder to the interior of the pod 200 in front of the seat 225. The tray may be used to hold cereal, cut vegetables, and other snacks for the child 900. The cup holder may be used to carry a bottle or a cup. In some embodiments, the cup holder may be hingedly coupled to the tray and may pivot to a position under the tray when not in use.

The electronics may comprise one or more generators, a battery 415, a phone charging port 420, and one or more lights 425.

Figure 7:
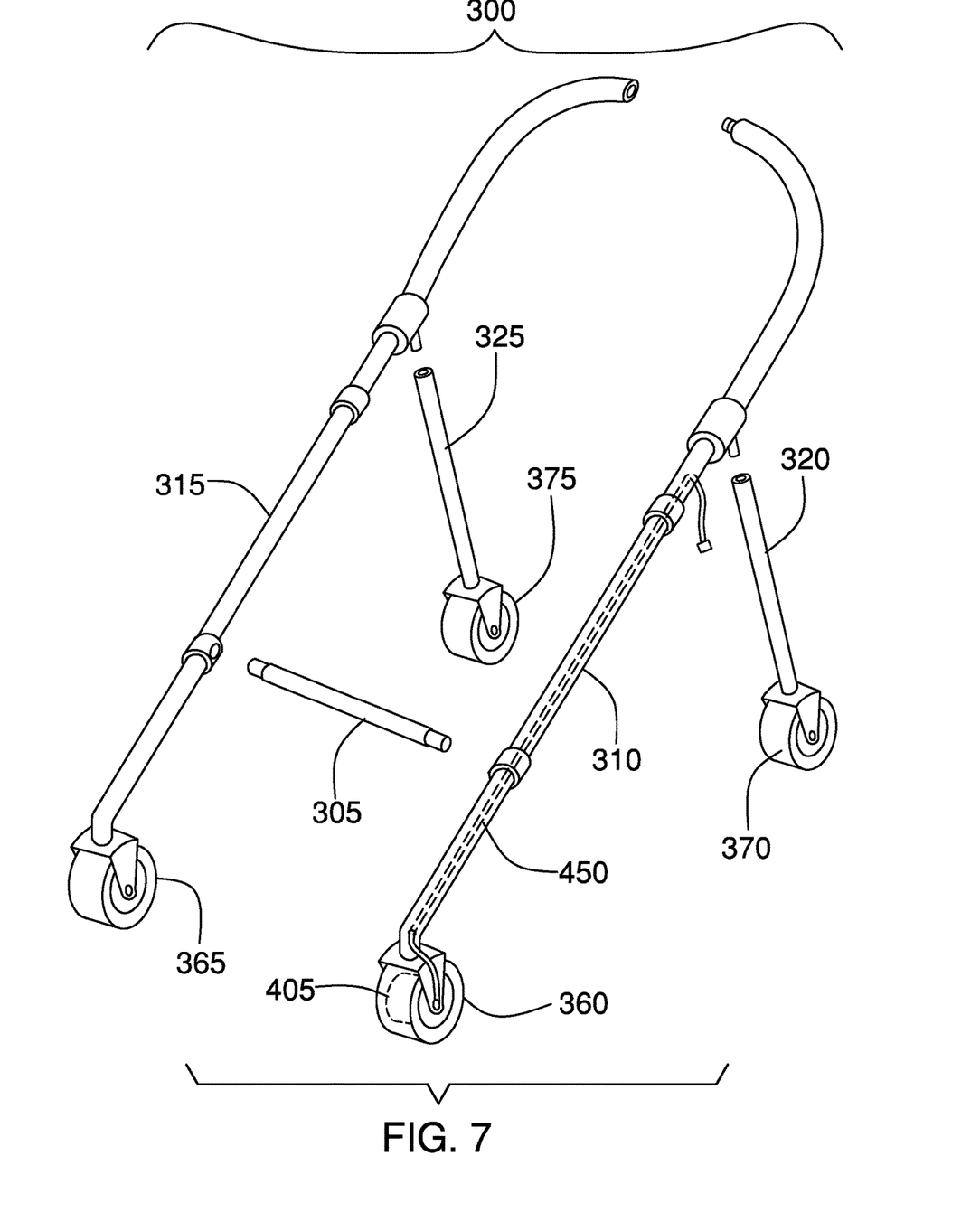
FIG. 7 is an exploded view of an embodiment of the disclosure illustrating components comprising the frame.

The frame 300 comprises a left front leg 310, a right front leg 315, a cross brace 305, a left rear leg 320, a right rear leg 325, and a plurality of wheels. The frame 300 supports the pod 200 above ground level and makes the pod 200 mobile via the plurality of wheels located at the bottom of the frame 300.

The left front leg 310 may be the shape of one half of an upside-down letter U. A left front wheel 360 may be coupled to the lower end of the left front leg 310. The right front leg 315 may be the shape of one half of an upside-down letter U. A right front wheel 365 may be coupled to the lower end of the right front leg 315.

The right front leg 315 and the left front leg 310 may removably couple to each other at the top of each leg to form an entire upside-down U. The curved portion of the U at the top where the right front leg 315 and the left front leg 310 couple may form a handle that may be used to push the invention 100. The pod 200 may couple between the right front leg 315 and the left front leg 310 at a midpoint of the right front leg 315 and a midpoint of the left front leg 310. The cross brace 305 may couple between the right front leg 315 and the left front leg 310. The cross brace 305 may couple to the right front leg 315 at a point between the pod 200 and the right front wheel 365. The cross brace 305 may couple to the left front leg 310 at a point between the pod 200 and the left front wheel 360.

The left rear leg 320 couples to the left front leg 310 at a point higher than the point where the pod 200 couples to the left front leg 310. The left rear leg 320 extends downward from the left front leg 310 and towards the rear. A left rear wheel 370 is coupled to the lower end of the left rear leg 320. The right rear leg 325 couples to the right front leg 315 at a point higher than the point where the pod 200 couples to the right front leg 315. The right rear leg 325 extends downward from the right front leg 315 and towards the rear. A right rear wheel 375 is coupled to the lower end of the right rear leg 325.

The plurality of wheels comprises the left front wheel 360, the right front wheel 365, the left rear wheel 370, and the right rear wheel 375. The left front wheel 360 and the right front wheel 365 may be steerable wheels located at the front of the frame 300. The left rear wheel 370 and the right rear wheel 375 may be non-steerable wheels located at the rear of the frame 300. A generator 405 selected from the one or more generators may located within one or more of the plurality of wheels. The generator 405 may be mechanically coupled to an individual wheel such that rotation of the individual wheel as the invention 100 is pushed causes the generator 405 to produce an electric current. The electricity so produced may be passed over wiring located within the frame 300 to the battery 415 and may recharge the battery 415.

The battery 415 may comprise one or more energy-storage devices. The battery 415 may be a source of electrical energy to operate the phone charging port 420 and the one or more lights 425. The battery 415 may be replaceable or rechargeable. The battery 415 may be located within the pod rear shell 220. The phone charging port 420 may be an electrical connector into which a charging cable for the phone may be plugged. An electrical potential available at the phone charging port 420 may recharge the phone. The pod rear shell 220 may comprise the one or more lights 425 that are located on the interior surface of the pod rear shell 220, on the exterior surface of the pod rear shell 220, or both. The one or more lights 425 may be adapted to provide illumination for viewing the child 900, may increase safety by providing awareness of the presence of the invention 100, or both.

Figure 6A:
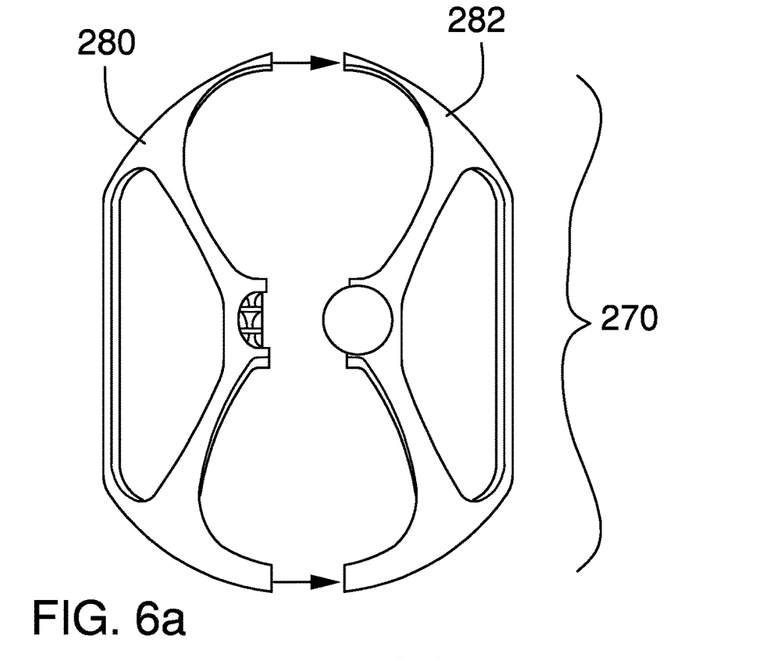
FIG. 6a is a detail view of an embodiment of the disclosure illustrating the modular insert when disassembled.
Figure 6B:
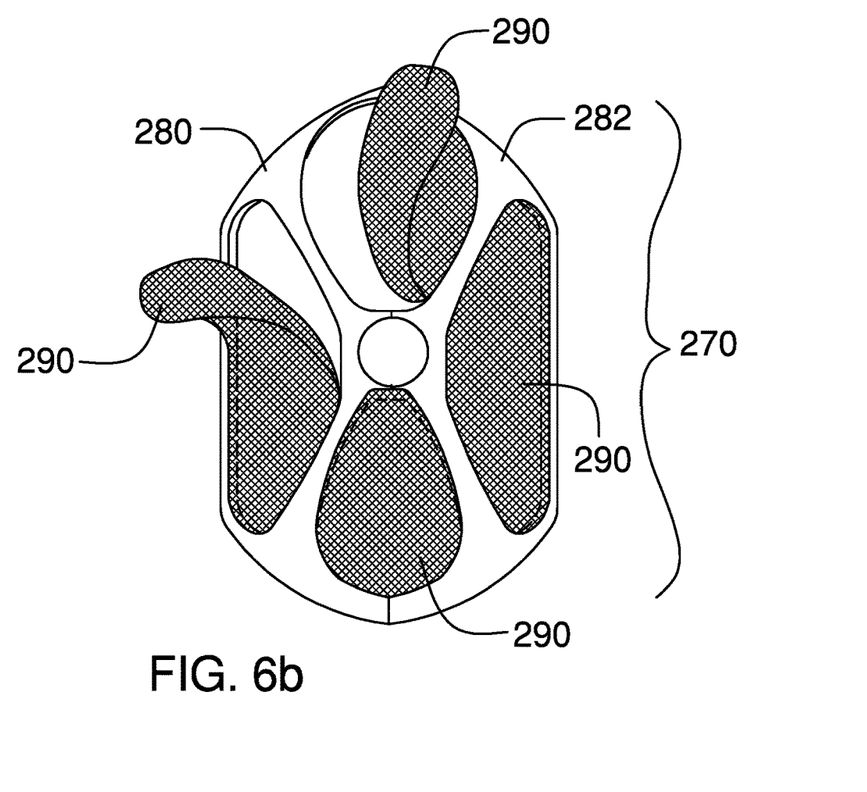
FIG. 6b is a detail view of an embodiment of the disclosure illustrating the modular insert when assembled.

In some embodiments, the invention 100 may comprise the modular insert 270. The modular insert 270 may be adapted to provide additional protection to the child 900. As a non-limiting example, a plurality of filter pads 290 may be coupled to the modular insert 270 and the modular insert 270 may be placed inside the pod 200 between the seat 225 and the pod front shell 210 to filter the airflow through the pod 200. The modular insert 270 may comprise a first insert half 280 and a second insert half 285 which couple to each other to form the modular insert 270.

Figure 5A:
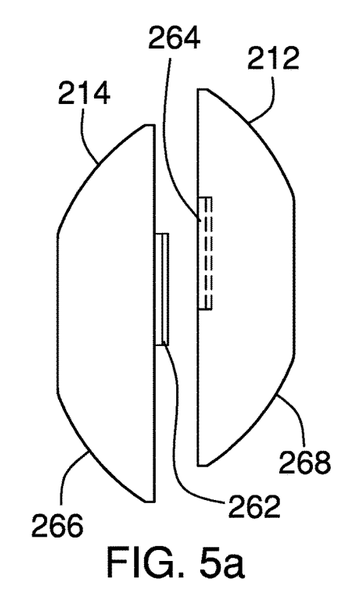
FIG. 5a is a detail view of an embodiment of the disclosure illustrating the two halves of the pod front shell when separated from each other.
Figure 5B:
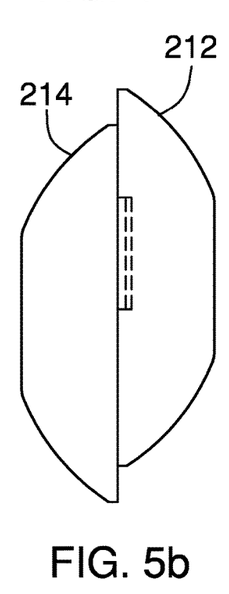
FIG. 5b is a detail view of an embodiment of the disclosure illustrating the left front half of the pod front shell and the right front half of the pod front shell being coupled together.
Figure 5C:
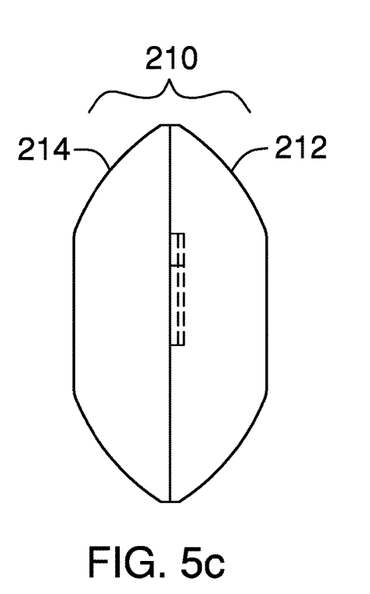
FIG. 5c is a detail view of an embodiment of the disclosure illustrating the pod front half fully assembled.

The pod front shell 210 may comprise a left front half 212 and a right front half 214 that couple to each other to form the front of the pod 200. In some embodiments, the left front half 212 and the right front half 214 may couple to each other using an interlocking tab fastener. The interlocking tab fastener may comprise a tab 262 on a first component 266 and a slot 264 on a second component 268 such that the tab 262 mates with the slot 264 by sliding, snapping, grasping, interlocking, or otherwise coupling to it. In some embodiments, the pod rear shell 220 may comprise a left rear half 222 and a right rear half 224 that couple to each other using another one of the interlocking tab fasteners.

Figure 8:
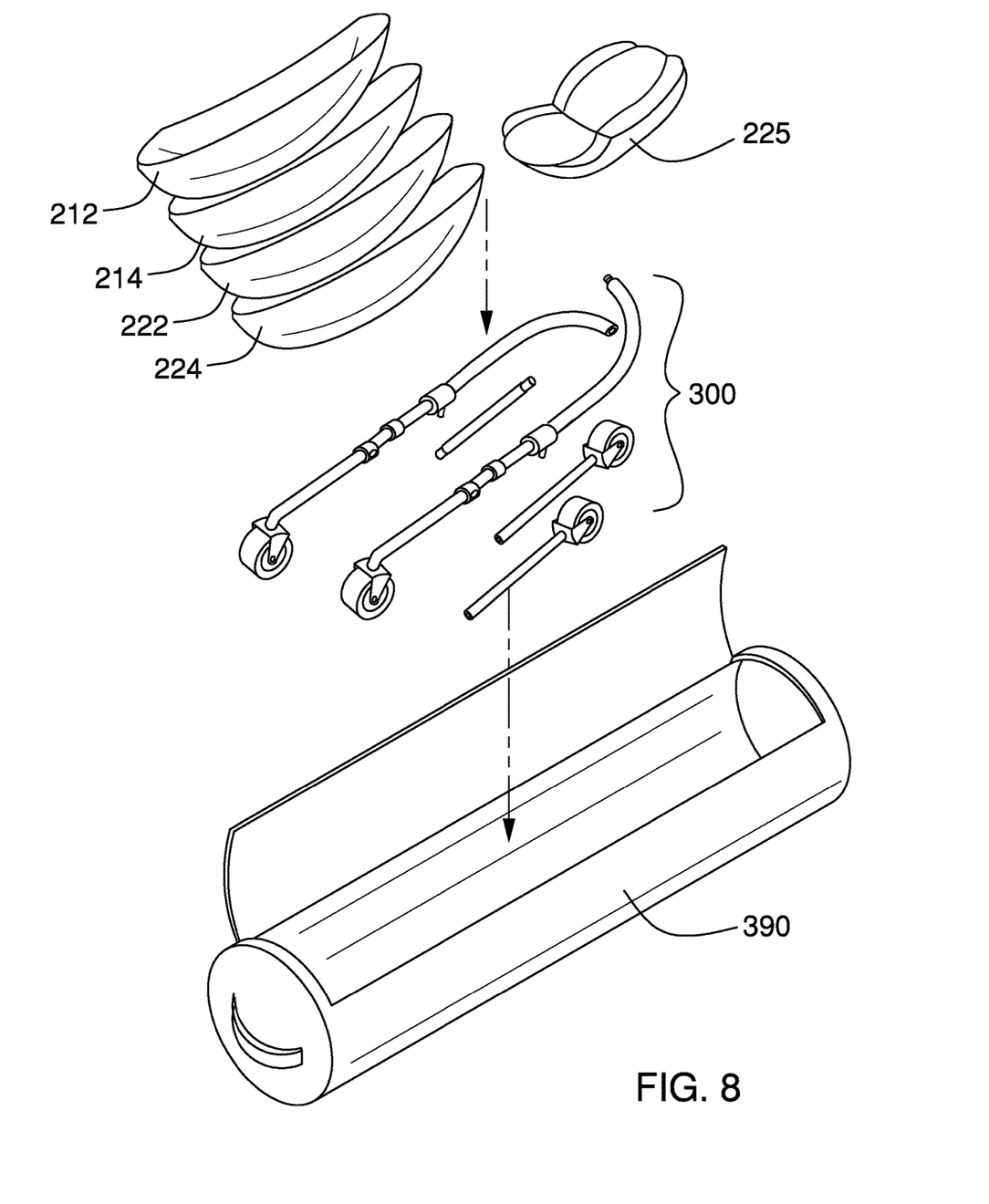
FIG. 8 is a detail view of an embodiment of the disclosure illustrating disassembled components being placed into the travel/storage bag.

A plurality of storage sleeves 230 may be storage areas on the exterior of the pod 200 that may be used for storing the plurality of filter pads 290 and other items. A travel/storage bag 390 may store the frame 300 when it is disabled. The left front half 212 of the pod front shell 210, the right front half 214 of the pod front shell 210, the left rear half 222 of the pod rear shell 220, the right rear half 224 of the pod rear shell 220, the first insert half 280, and the second insert half 285 may be stacked on top of each other and stored in the travel/storage bag 390, also. The pod 200 may comprise a storage pouch 255 which is a storage area for cups or other personal items and which is located on the exterior surface of the pod 200.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "accessory" is a second object that adds to the convenience or attractiveness of a first object. In some instances, an accessory may extend the functionality of the first object by allowing the combination of the accessory plus the first object to perform a task that the first object could not perform alone.

As used in this disclosure, a "bag" is a container made of a flexible material. The bag has a single opening which allows the bag to receive the items to be contained.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "brace" is a structural element that is used to support or otherwise steady an object.

As used in this disclosure, a "cable" is a collection of insulated wires covered by a protective casing that is used for transmitting electricity or telecommunication signals.

As used herein, the words "couple", "couples", "coupled" or "coupling", refer to connecting, either directly or indirectly, and does not necessarily imply a mechanical connection.

As used in this disclosure, the word "exterior" is used as a relational term that implies that an object is not located or contained within the boundary of a structure or a space.

As used in this disclosure, a "fastener" is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

As used herein, "front" indicates the side of an object that is closest to a forward direction of travel under normal use of the object or the side or part of an object that normally presents itself to view or that is normally used first. "Rear" or "back" refers to the side that is opposite the front.

In this disclosure, a "generator" converts rotational mechanical energy into electric energy.

As used in this disclosure, a "handle" is an object by which a tool, object, or door is held or manipulated with the hand.

As used in this disclosure, a "harness" is an apparatus comprising a plurality of straps and one or more fasteners that is used to fasten or anchor a first person or first object to a second object. The phrase "N point harness" refers to the installation of the harness wherein the harness has N anchor points. As a non-limiting example, a 2 point harness has two anchor points while a 5 point harness has 5 anchor points.

As used in this disclosure, the word "interior" is used as a relational term that implies that an object is located or contained within the boundary of a structure or a space.

As used herein, "mate" refers to coupling at a predefined interface.

As used here, the word "midpoint" refers to a point near the center of an object. An "exact midpoint" refers to a midpoint that is equidistant from edges of the object in at least one direction. Unless otherwise stated, a midpoint is not required to be at the exact center of the object but instead may be within 50% of the distance from the exact midpoint to the farthest edge.

As used in this disclosure, "opaque" refers to an object or material that prevents the passage of light and/or other forms of radiations through the object or material.

As used herein, the word "ovoid" refers to a three dimensional structure with an oval shape. The relationship between an ovoid and an oval is analogous to the relationship between an ellipsoid and an ellipse.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "shell" is a structure that forms an outer covering intended to contain an object. Shells are often, but not necessarily always, rigid or semi-rigid structures that are intended to protect the object contained within it. Some shells may only partially cover the exterior surface of the object.

As used in this disclosure, a "slot" is a long narrow groove, cut, opening, or aperture that is formed in or through an object.

As used in this disclosure, a "tab" is an extension of an object for the purpose of facilitating the manipulation of the object, identifying the object, or attaching the object to another object.

As used in this disclosure, "transparent" refers to a material that allows light to pass through the material without significant scattering such that an object can be clearly seen through the material.

As used in this disclosure, a "tray" is a flat plate-like structure that has a raised rim formed around the perimeter for the purpose of containing fluids within the structure of the tray. Trays will generally give an impression of being a shallow containment device. Trays are often used for carrying food and drink or for holding small items.

As used in this disclosure, a "wheel" is a circular object that revolves around an axle or an axis and is fixed below an object to enable it to move easily over the ground.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A collapsible stroller comprising:
a pod, electronics, and a frame;
wherein the collapsible stroller is adapted to be a conveyance for a child;
wherein the collapsible stroller is adapted to enclose the child in the pod for weather protection;
wherein the collapsible stroller is adapted to cover the child with a modular insert for additional protection and filtration;
wherein the collapsible stroller is adapted to charge a phone;
wherein the pod comprises a pod front shell, a pod rear shell, a seat, an accessory holder, and a tray/cup holder;
wherein the pod is one of an ovoid, ellipsoidal, or spherical covering for the seat that is adapted to protect the child from wind, rain, or other inclement weather conditions;
wherein the pod couples to the frame;
wherein the pod front shell is made from a transparent material and is located in front of the seat;
wherein the pod rear shell is a rear half of the pod and is a mounting point for the seat;
wherein the pod rear shell comprises a plurality of vents to allow airflow through the pod;
wherein the pod rear shell comprises a plurality of hand grips to allow the pod to be moved.

2. The collapsible stroller according to claim 1
wherein a ventilation fan located behind one of the plurality of vents moves air.

3. The collapsible stroller according to claim 1
wherein one of the plurality of hand grips is mounted at the top rear of the pod rear shell and another of the plurality of hand grips is located at the bottom rear of the pod rear shell;
wherein the seat is a cushioned area adapted for the child to sit in;
wherein the seat comprises a harness that is adapted to retain the child;
wherein the bottom and/or back of the seat couple to the interior side of the pod rear shell.

4. The collapsible stroller according to claim 3
wherein the accessory holder is a mounting point for an accessory;
wherein the accessory holder is located on the left interior side wall of the pod, on the right interior side wall of the pod, or on both interior side walls of the pod;
wherein the tray/cup holder is the accessory for the collapsible stroller;
wherein the tray/cup holder couples to the accessory holder and adds a snack tray and a cup holder to the interior of the pod in front of the seat.

5. The collapsible stroller according to claim 4
wherein the electronics comprises one or more generators, a battery, a phone charging port, and one or more lights.

6. The collapsible stroller according to claim 5
wherein the frame comprises a left front leg, a right front leg, a cross brace, a left rear leg, a right rear leg, and a plurality of wheels;
wherein the frame supports the pod above ground level and makes the pod mobile via the plurality of wheels located at the bottom of the frame.

7. The collapsible stroller according to claim 6
wherein the left front leg is the shape of one half of an upside-down letter U;
wherein a left front wheel is coupled to the lower end of the left front leg;
wherein the right front leg is the shape of one half of an upside-down letter U;
wherein a right front wheel is coupled to the lower end of the right front leg.

8. The collapsible stroller according to claim 7
wherein the right front leg and the left front leg removably couples to each other at the top of each leg to form an entire upside-down U;
wherein the curved portion of the U at the top where the right front leg and the left front leg couple forms a handle that is used to push the collapsible stroller;
wherein the pod couples between the right front leg and the left front leg at a midpoint of the right front leg and a midpoint of the left front leg;
wherein the cross brace couples between the right front leg and the left front leg;
wherein the cross brace couples to the right front leg at a point between the pod and the right front wheel;
wherein the cross brace couples to the left front leg at a point between the pod and the left front wheel.

9. The collapsible stroller according to claim 8
wherein the left rear leg couples to the left front leg at a point higher than the point where the pod couples to the left front leg;
wherein the left rear leg extends downward from the left front leg and towards the rear;
wherein a left rear wheel is coupled to the lower end of the left rear leg;
wherein the right rear leg couples to the right front leg at a point higher than the point where the pod couples to the right front leg;
wherein the right rear leg extends downward from the right front leg and towards the rear;
wherein a right rear wheel is coupled to the lower end of the right rear leg.

10. The collapsible stroller according to claim 9
wherein the plurality of wheels comprises the left front wheel, the right front wheel, the left rear wheel, and the right rear wheel;

wherein the left front wheel and the right front wheel are steerable wheels located at the front of the frame;

wherein the left rear wheel and the right rear wheel are non-steerable wheels located at the rear of the frame;

wherein a generator selected from the one or more generators is located within one or more of the plurality of wheels;

wherein the generator is mechanically coupled to an individual wheel such that rotation of the individual wheel as the collapsible stroller is pushed causes the generator to produce an electric current;

wherein the electric current is passed over wiring located within the frame to the battery and recharges the battery.

11. The collapsible stroller according to claim 10 wherein the battery comprises one or more energy-storage devices;

wherein the battery is a source of electrical energy to operate the phone charging port and the one or more lights;

wherein the battery is replaceable or rechargeable;

wherein the battery is located within the pod rear shell;

wherein the phone charging port is an electrical connector into which a charging cable for the phone is plugged;

wherein an electrical potential available at the phone charging port recharges the phone;

wherein the pod rear shell comprises the one or more lights that are located on the interior surface of the pod rear shell, on the exterior surface of the pod rear shell, or both;

wherein the one or more lights are adapted to provide illumination for viewing the child, increases safety by providing awareness of the presence of the collapsible stroller, or both.

12. The collapsible stroller according to claim 11 wherein the collapsible stroller comprises the modular insert;

wherein the modular insert is adapted to provide additional protection to the child.

13. The collapsible stroller according to claim 12 wherein a plurality of filter pads are coupled to the modular insert and the modular insert is placed inside the pod between the seat and the pod front shell to filter the airflow through the pod;

wherein the modular insert comprises a first insert half and a second insert half which couple to each other to form the modular insert.

14. The collapsible stroller according to claim 13 wherein the pod front shell comprises a left front half and a right front half that couple to each other to form the front of the pod;

wherein the left front half and the right front half couple to each other using an interlocking tab fastener;

wherein the interlocking tab fastener comprises a tab on a first component and a slot on a second component such that the tab mates with the slot by sliding, snapping, grasping, interlocking, or otherwise coupling to it.

15. The collapsible stroller according to claim 14 wherein the pod rear shell comprises a left rear half and a right rear half that couple to each other using another one of the interlocking tab fasteners.

16. The collapsible stroller according to claim 15 wherein a plurality of storage sleeves are storage areas on the exterior of the pod that are used for storing the plurality of filter pads and other items;

wherein a travel/storage bag stores the frame when it is disabled;

wherein the left front half of the pod front shell, the right front half of the pod front shell, the left rear half of the pod rear shell, the right rear half of the pod rear shell, the first insert half, and the second insert half are stacked on top of each other and stored in the travel/storage bag.

17. The collapsible stroller according to claim 16 wherein the pod comprises a storage pouch which is a storage area for cups or other personal items and which is located on the exterior surface of the pod.

* * * * *